April 27, 1937.　　　R. H. LAWSON　　　2,078,330
ASSEMBLING MACHINE
Filed March 30, 1936　　　9 Sheets-Sheet 1

INVENTOR
Robert H. Lawson
By his attorney
Victor Cohl

April 27, 1937.   R. H. LAWSON   2,078,330
ASSEMBLING MACHINE
Filed March 30, 1936   9 Sheets-Sheet 2

INVENTOR
Robert H. Lawson
By his attorney
Victor Cobb

April 27, 1937.   R. H. LAWSON   2,078,330
ASSEMBLING MACHINE
Filed March 30, 1936   9 Sheets-Sheet 3

Fig. 5.

April 27, 1937.  R. H. LAWSON  2,078,330
ASSEMBLING MACHINE
Filed March 30, 1936    9 Sheets-Sheet 4

Fig. 6.

INVENTOR
Robert H. Lawson
By his attorney
Victor Cobb

April 27, 1937.  R. H. LAWSON  2,078,330
ASSEMBLING MACHINE
Filed March 30, 1936  9 Sheets-Sheet 5

INVENTOR
Robert H. Lawson
By his attorney
Victor Cobb

April 27, 1937.  R. H. LAWSON  2,078,330
ASSEMBLING MACHINE
Filed March 30, 1936  9 Sheets-Sheet 6

INVENTOR
Robert H. Lawson
By his attorney
Victor Cobb

April 27, 1937.  R. H. LAWSON  2,078,330
ASSEMBLING MACHINE
Filed March 30, 1936  9 Sheets-Sheet 7

INVENTOR
Robert H. Lawson
By his attorney
Victor Cobb

April 27, 1937.  R. H. LAWSON  2,078,330
ASSEMBLING MACHINE
Filed March 30, 1936  9 Sheets-Sheet 8

INVENTOR
Robert H. Lawson
By his attorney
Victor Cobb

Fig. 17.

Patented Apr. 27, 1937

2,078,330

UNITED STATES PATENT OFFICE 2,078,330

ASSEMBLING MACHINE

Robert H. Lawson, Beverly, Mass., assignor to United Shoe Machinery Corporation, Paterson, N. J., a corporation of New Jersey Application March 30, 1936, Serial No. 71,671

43 Claims. (Cl. 12—4)

This invention relates to machines for operating upon shoes and is disclosed herein as embodied in an assembling machine.

The purpose of the assembling machine is to perform an initial lasting operation, preparatory to the pulling-over operation. In the assembling operation an upper is placed on a last to which an insole has already been tacked in the usual manner, and a counter, which is generally molded with an inturned flange, is placed between the lining and the upper, these parts of the shoe being loosely arranged on the last as well as possible after jacking the last. The last with the shoe on it is then presented to the assembling machine, which stretches the upper forwardly and upwardly over the heel end of the inverted last, and tacks the counter to the insole at the heel breast locality.

The flange of the counter overlaps the rear end of the insole rib for a short distance, and it is necessary to turn it up and mold it into the angle between the rib and the lower face of the insole, in order that it may be sewed to the rib with the welt in the welt sewing operation, which makes it desirable to slash the flange just back of the molded portion in order that this portion of the flange may lie smoothly on the insole and be tacked thereto in the heel breast locality and that the forward portions or wings of the counter may be more readily turned up against the lip. It is also customary, in the assembling operation, to wipe down the upper over the rear end of the insole and to tack it thereto.

It has been customary in machines of this type for the operator to arrange the shoe parts as well as possible on the jack in an inoperative position, somewhat removed from the operating instrumentalities of the machine, and then to move the jack into operative position in the machine by hand, this movement being availed of to trip the machine and to start the operating instrumentalities forthwith. I have found that the operation can be made more positive and accurate by giving the operator an opportunity to correct the arrangement of the shoe parts after the jack has reached operative position. For example, it is vital that the upper and lining be properly arranged between the tensioning grippers before they close; otherwise the upper may be unevenly or unsymmetrically stretched.

It is, therefore, a principal object of the present invention to provide a machine which will afford this advantage. Accordingly, I have provided a machine which, on being treadled, moves the jack into its operative position by power (thus relieving the operator of the labor of moving it himself), and then stops until it is treadled a second time, thus giving the operator ample time to satisfy himself that the shoe and the operating instrumentalities of the machine are in proper relationship before the actual operation on the shoe is begun. As far as I am aware this feature of the invention is broadly novel, and its advantages are not restricted to assembling machines.

Another important feature of the invention relates to the molding or forming of the end of the counter flange against the rear end of the insole rib. This portion of the insole rib is farther from the heel end in a large shoe than in a small one, and it is necessary, therefore, to provide for the molding operation at varying positions, relatively to the machine, on shoes of different sizes. In the machine of the present invention, those instrumentalities, tensioning, forming, slashing, and tacking, which operate at the heel breast region of the shoe are arranged to move outwardly and forwardly from a central position relatively to a shoe in the machine until the anvil against which the counter flange forming blow takes place comes to rest against the insole rib. This movement will be of greater extent in the case of a larger shoe than in that of a smaller one, since the insole ribs are farther apart in the former case than in the latter. Thus the operating position of the forming mechanism and of all the others is properly graded into the shoe.

Novelty is also to be recognized in the simultaneous operation of various combinations of shoe treating instrumentalities on both sides of the shoe at the heel breast region; in combinations of tensioning and slashing means and of tensioning means and forming means operating at the heel breast region; in a combination of equal and oppositely moving former anvils with a jack centralizing mechanism; in a mechanism for throwing the shoe from a downwardly and outwardly tilted position to a horizontal operative position incidental to the movement of the jack into the machine; and in a toggle mechanism for throwing the formers against the anvils.

These and other features of the invention comprising certain combinations and arrangements of parts will be apparent from the following description of a preferred embodiment of the invention shown in the drawings, in which.

The machine frame is denoted by the numeral 10.

Figures 1, 2:
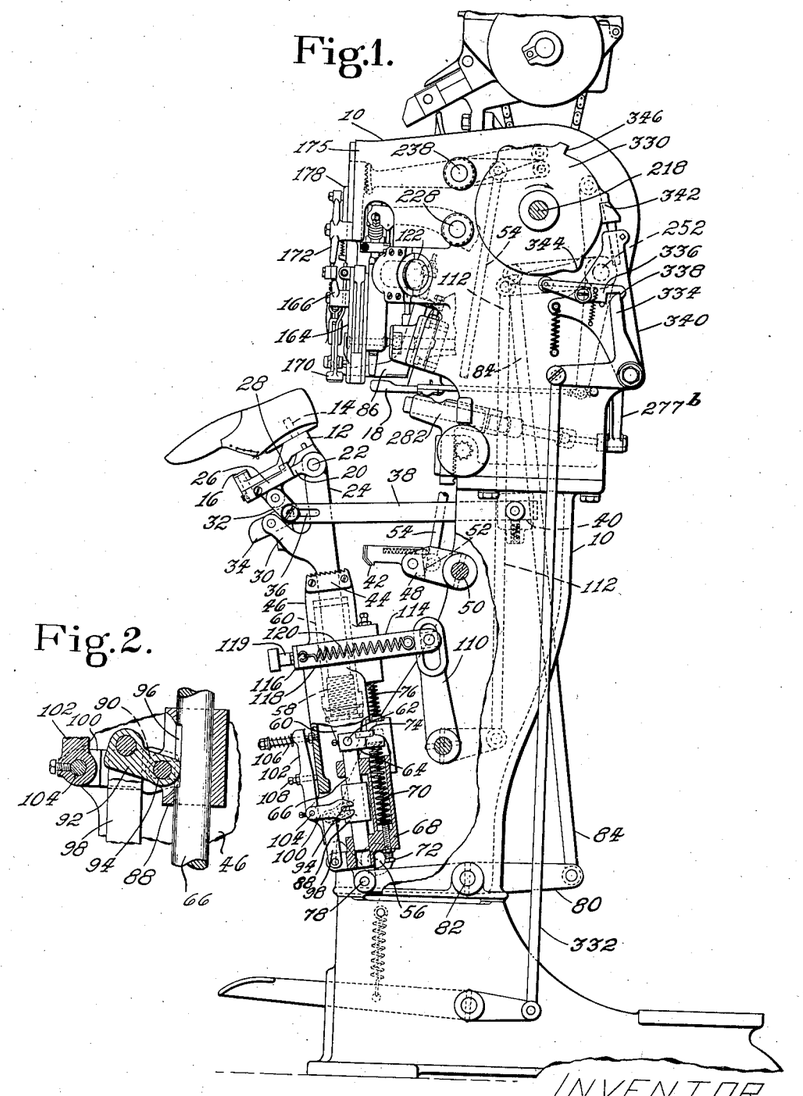
Fig. 1 is a side elevation.
Fig. 2 is a detail of the jack mechanism.
Figures 7, 8, 9, 10:
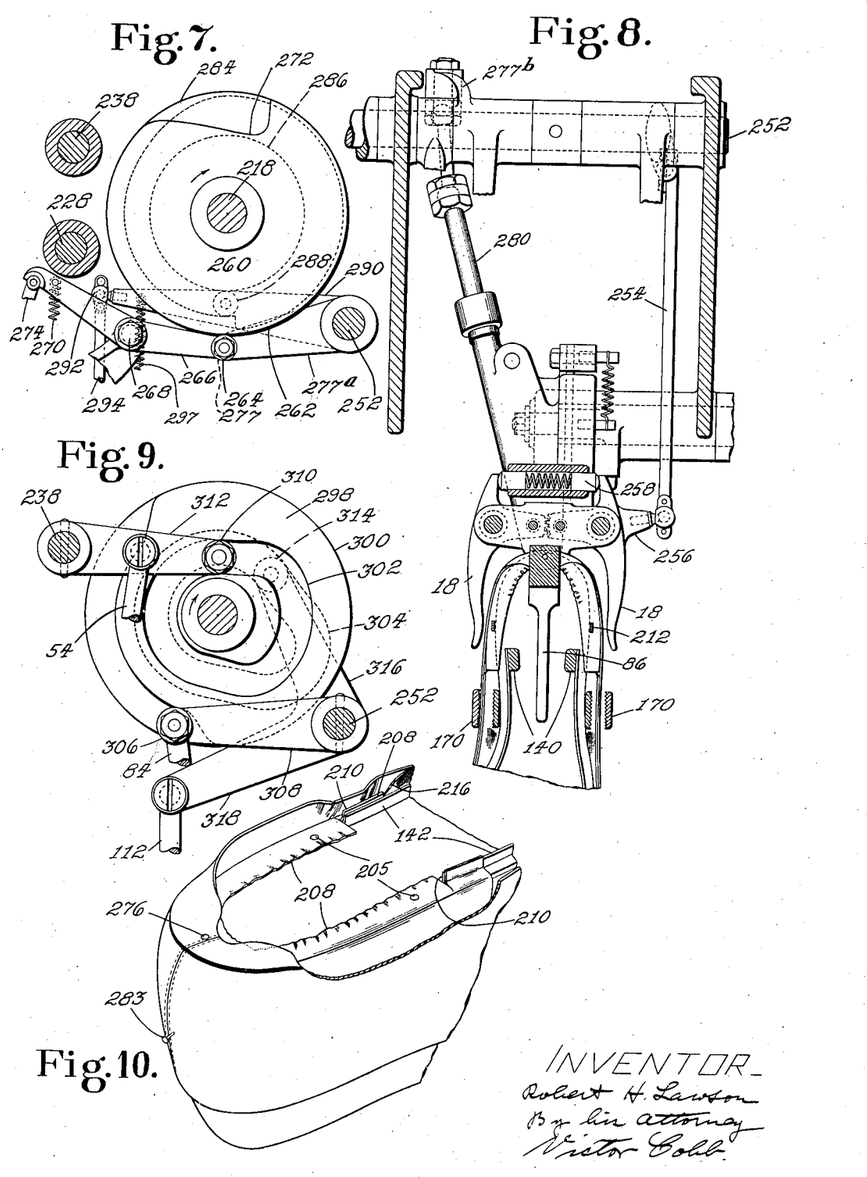
Fig. 7 is a sectional elevation on the line VII—VII of Fig. 11.
Fig. 8 is a sectional plan of a portion of the machine at about the plane of the shoe bottom.
Fig. 9 is a sectional elevation on the line IX—IX of Fig. 11.
Fig. 10 is a perspective view of the heel end of the shoe after being operated upon.

For supporting the shoe there is provided a support or jack best shown in Fig. 1. The heel end of the shoe is supported by a member 12, the upper surface of which is formed to engage the top of the cone of the last, and is provided with a jack pin 14. The member 12 is pivoted at 16 on a pin extending heightwise of the last and shoe thereon, and located forwardly of the jack pin, so that the heel end of the shoe may be centralized between two geared equiacting centralizing fingers 18 (Fig. 8) when in operative position, as will be described below. The pin 16 is mounted on a block 20 pivoted at 22 on the upper end of a jack post 24. The block 20 is provided with a pair of equalizing leaf springs 26 to effect approximate centralization of the member 12 when it is swung out of operative position toward the operator as in Fig. 1. This is effected by upstanding ears 28 on the springs 26, engaging opposite sides of the member 12.

The axis at 22 is horizontal and crosswise of the shoe. The post 24 has an arm 30 connected by two toggle links 32, 34 to the block 20. The central point of the toggle links is carried in a slot 36 in the end of a bar 38 which is supported in a friction device 40 in the frame 10. When the jack is tipped clockwise from the position shown in Fig. 1 to operative position, the toggle joint first runs to the right end of the slot 36 and then the friction device 40 causes the toggle links to straighten and tips the block 20 about the axis 22 to bring the shoe bottom into an approximately horizontal position. The friction device then slips until the jack post 24 has been brought to an approximately vertical position.

This position of the jack is maintained by a set of differential pawls 42 which engage teeth in a plate 44 mounted at the top of a casing 46 which carries the jack post 24. The pawls 42 are pivoted in an arm 48 pivoted at 50 on the frame 10 and are spring-pressed counterclockwise (Fig. 1) around their pivot, their movement in this direction being limited by stops 52 so that the pawls can be released from the plate 44 by pulling up on the rod 54 as will be described below.

The jack post 24 is slidably mounted in the casing 46 which is pivoted at 56 to the machine frame 10. The post rests upon an adjusting screw 58 in the casing 46, by means of which its height can be regulated. The screw 58 is threaded into a carrier 60 which slides vertically in the casing 46. The carrier 60 is pivoted at its lower end at 62 to a block 64 rigidly mounted on the upper end of a rod 66 slidably mounted in a vertically movable block 68 having a spring 70 mounted in a bore therein and pressing upwardly against the block 64. The compression of the spring 70 is regulated by an abutment screw 72. The block 68 overhangs the block 64 at 74, and tends to pull it downward at times, but the block 68 can rise relatively to the block 64, the spring 70 being then compressed. Also, a spring 76 is provided, between the portion 74 and a shoulder on the casing 46, which tends to force the block 68 downwardly. The block 68 is located in a cut-out portion at the rear of the casing 46, but does not contact with the casing; it is in effect carried slidably by the rod 66, which hangs on the bottom of the member 60, which does have a sliding fit in the casing 46.

The block 68 is pivoted at its lower end at 78 to the end of an operating lever 80, pivoted at 82 on the frame 10. The rocking of the lever 80, by the downward movement of the rod 84, raises the block 68 and through the spring 70 effects a resilient upward movement of the elements 64, 60 and the jack post 24. This forces a shoe on the jack up against a holddown 86 (Fig. 6), which will be discussed in more detail below.

Provision is also made for a positive non-resilient movement of the jack post, following the resilient movement just mentioned. To this end a collar 88 is slidably mounted on the bar 66. The collar 88 has (Fig. 2) two spaced ears 90 on its front side between which is pivotally mounted a clutch dog 92 on a pin 94, which is supported in the ears 90. The dog 92 is arranged to jam on a flat place 96 on the bar 66 when turned clockwise as seen in Fig. 2. The outer end of the dog 92 is pivotally connected to the lower end of the block 68 by a link 98. The ends of the pin 94 are embraced by notches in the ends of parallel forked horizontal arms 100 of a bell-crank lever 102 pivoted at 104 on the casing 46, the vertical arm of the bell-crank lever being resiliently forced clockwise (Fig. 1) by the spring 106, such movement being limited by a stop screw 108. This stop screw 108 is set so that a definite upward movement of the link 98 is necessary to turn the clutch dog 92 into gripping relation with the surface 96, and until this happens the upward movement of the jack post is resilient: afterward, the block 68, bar 66, slide 60 and jack post 24 all move positively, together, the spring 106 yielding during the positive movement, as the pin 94 rises with the bar 66.

The jack is pulled back into operative position by a bell-crank lever 110 operated by a rod 112 and connected to the jack by a resilient link 114. This link comprises a member 116 mounted on the casing 46 and a member 118 pivotally connected to the upstanding arm of the bell-crank 110, and having a reduced front end 119 slidably extending through a guide hole in the member 116, the members 116 and 118 being connected by a spring 120. This movement of the jack carries the shoe under the holddown member 86, which acts to wipe down the upper and counter at the rear end of the shoe.

Those features of the invention that relate to the jack and its operating mechanism are claimed in my divisional application, Serial No. 89,196, filed July 6, 1936.

The shoe treating mechanism will next be described. This comprises mechanism for drawing the rear end of the upper of the inverted shoe tightly upward, forward and inward in the region of the heel breast line, forming the ends of the counter flanges against the insole ribs slashing the counter at the heel breast line just to the rear of the formed portions, bending the counter flange down to the insole just behind the slash, and driving a tack through the bent-down portion of the counter flange just at the rear of the heel breast line, on each side of the shoe. Tacks are also driven at the rear end of the heel seat and at one side of the back seam about halfway up the rear end of the counter.

Figures 3, 4:
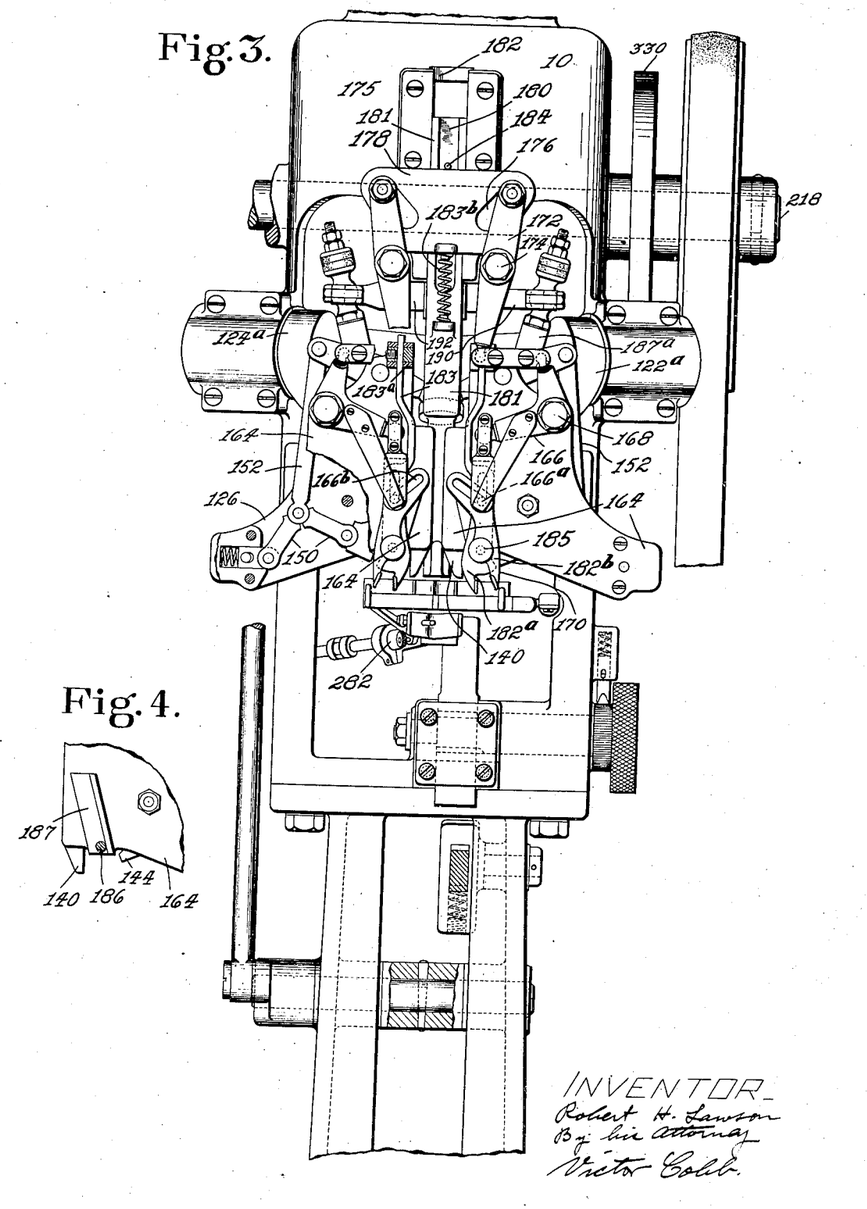
Fig. 3 is a front elevation.
Fig. 4 is a detail of the tensioning mechanism.
Figure 11:
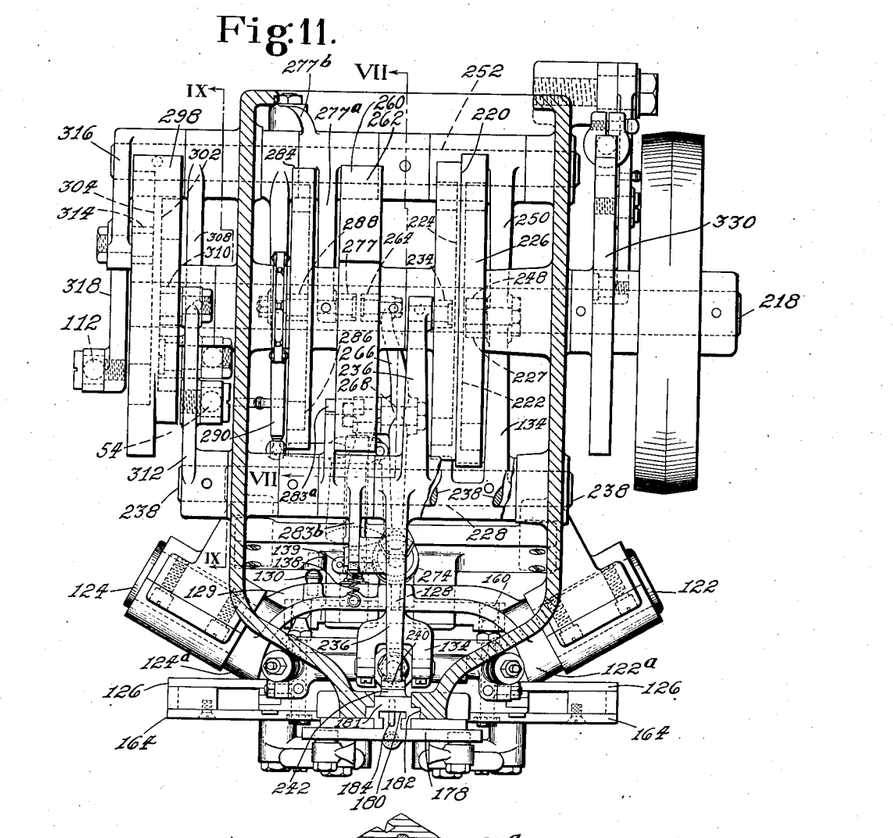
Fig. 11 is a sectional plan showing the driving and operating mechanism of the machine.

At the front of the machine (Fig. 3), in its upper portion, are mounted two trunnions 122, 124, the axes of which are horizontal and at opposite angles of about 60° with the fore-and-aft direction of the machine. These have depending arms 122a, 124a each of which carries a plate 126. Owing to the angular position of the trunnions these plates swing outward from each other as they swing forward around the axes of the trunnions. They are geared together by equalizing gears 128 (Fig. 6), on arms 129 (Fig. 11), so that they both move equally, when they move. They are urged toward their forward and separated position by a spring 130 (Figs. 6 and 11) which is connected to one of the gear arms 129, and are normally held against the pull of the spring 130 by a pin 132 (Fig. 6) on an arm 134. The pin 132 hooks under the end of a dog 136 (Fig. 6) springheld at 138 and attached at its lower end to one of the trunnion arms 129 by a ball joint 139.

Figure 5:
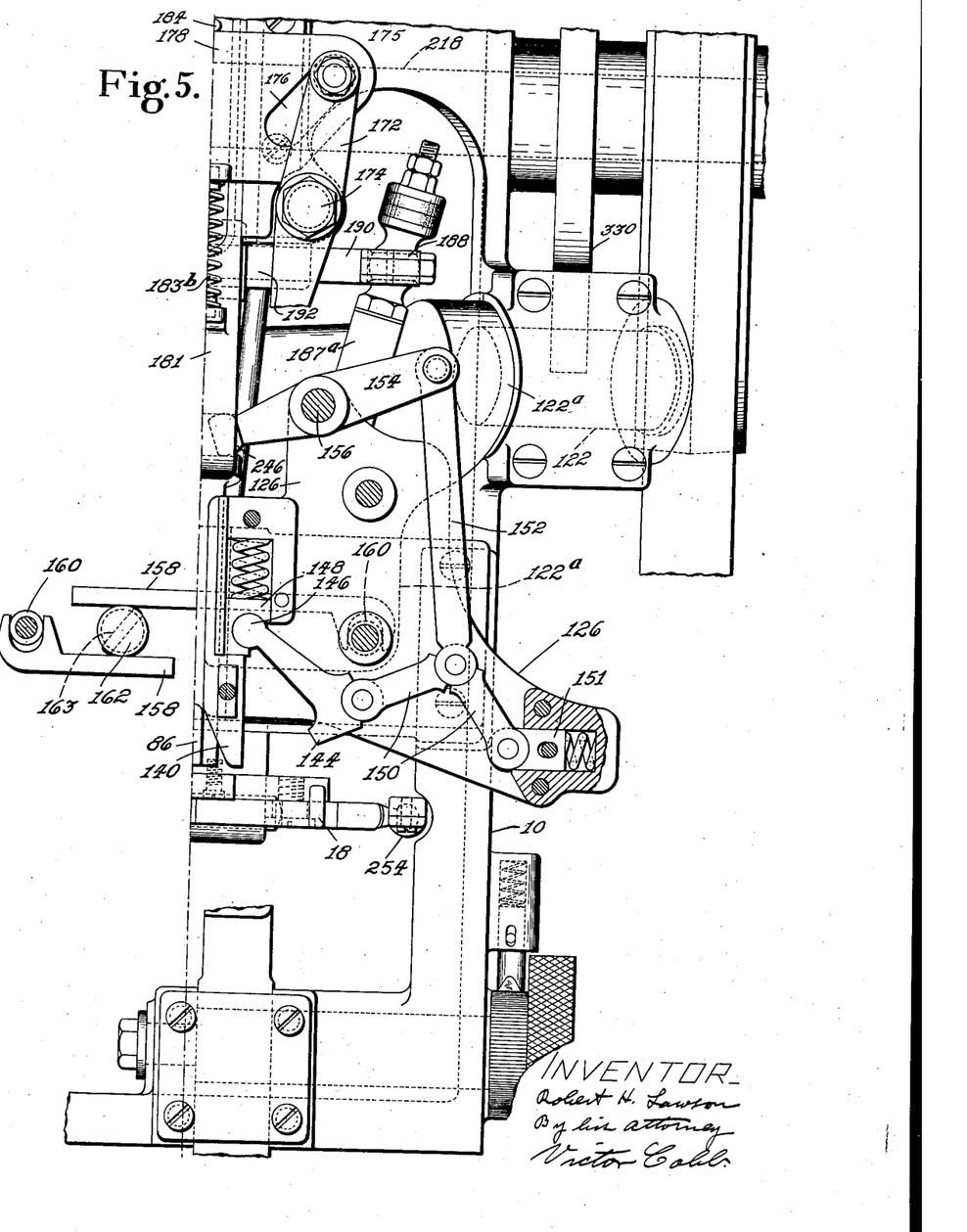
Fig. 5 is an enlarged front elevation of one side of the machine.
Figure 12:
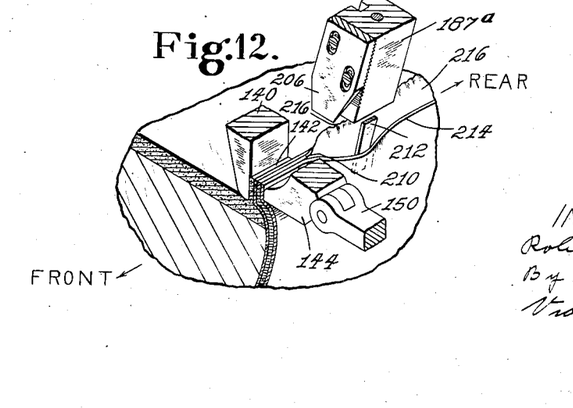
Fig. 12 is a detail of the heel end of the shoe before the operation upon it.
Figure 13:
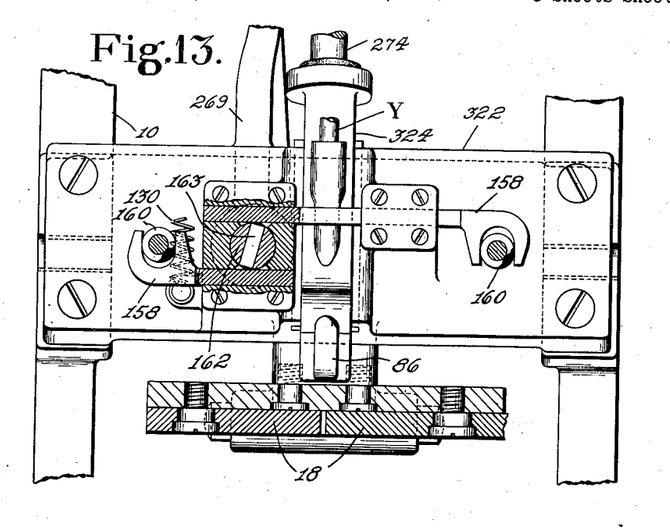
Figs. 13 and 14 are details showing the locking mechanism for the carriers of the mechanisms which operate on the shoe.
Figure 14:
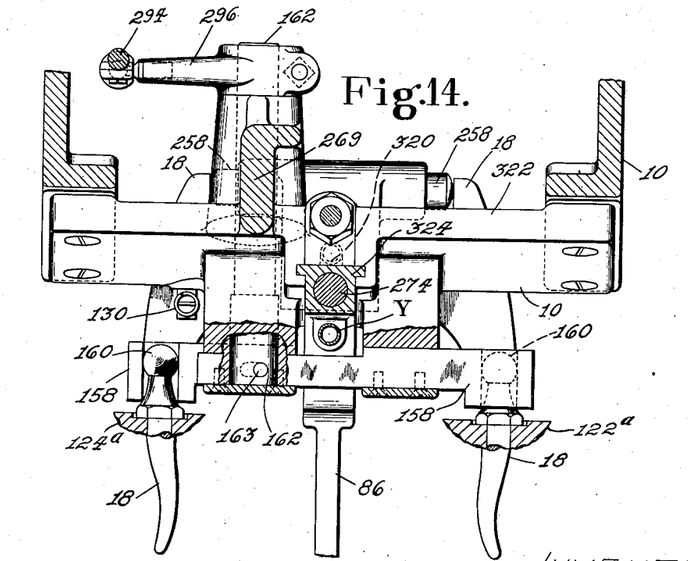

The lower ends of the plates 126 carry the inside formers or anvils 140 (Fig. 5). As the plates 126 swing outward these anvils come into contact with the inner sides of the insole ribs 142 and support them against the blow that is delivered (Figs. 10 and 12) upon the slashed upturned edges of the counter ends, at this point, in order to mold the counter preparatory to sewing its ends into the welt seam. The swing of the plates 126 is limited by the contact of the anvils 140 with the insole ribs, and owing to the angularity of the trunnions, the swing, which is greater over a wide insole than over a narrow one, will bring the anvils farther forward on the wider insole, so that the positions of the anvils and other instrumentalities to be described carried by the plates 126 are brought into substantially the same geometric relations to shoes of all sizes in the machine. The plates 126 also carry hammers or outside formers 144 (Fig. 5) pivoted at 146 in a resiliently supported block 148, and operated by toggle links 150, the outer one of which is pivoted in a resiliently supported block 151 on the plate 126, and which are straightened by links 152 operated by levers 154 pivoted at 156 on the plates 126. The trunnions and parts they carry are locked against swinging away from their operative positions by parallel bars 158, sliding in the frame 10, whose widened forked ends embrace ball-ended studs 160 (Figs. 5, 6, 11 and 14), mounted on the depending arms 122a, 124a of the trunnions 122 and 124. The bars 158 are cramped by a slight rotation of a rod 162 journaled in the frame 10 and having a slightly projecting crosspin 163 which, when turned with the rod 162, joins the bars 158, thus locking the trunnions in operative position.

The former operating mechanism is covered by cover plates 164 parallel to the plates 126 (Fig. 3) on which are pivotally mounted two bell-crank levers 166, at 168. The lower ends of these levers have ball joint connections with pincers 170, so that throwing up these lower ends of the levers will close the pincers. The upper ends of the bell-crank levers 166 are linked by ball joints, to levers 172, pivoted at 174, on the vertical front surface 175 of the frame 10. The upper ends of the levers 172 have cam rolls working in diverging slots or pincer cams 176 on a vertically sliding plate 178 running in a guide 180 (Figs. 3 and 6), in a block 181 sliding in a vertical guide 182 in the front frame wall 175.

Figure 6:
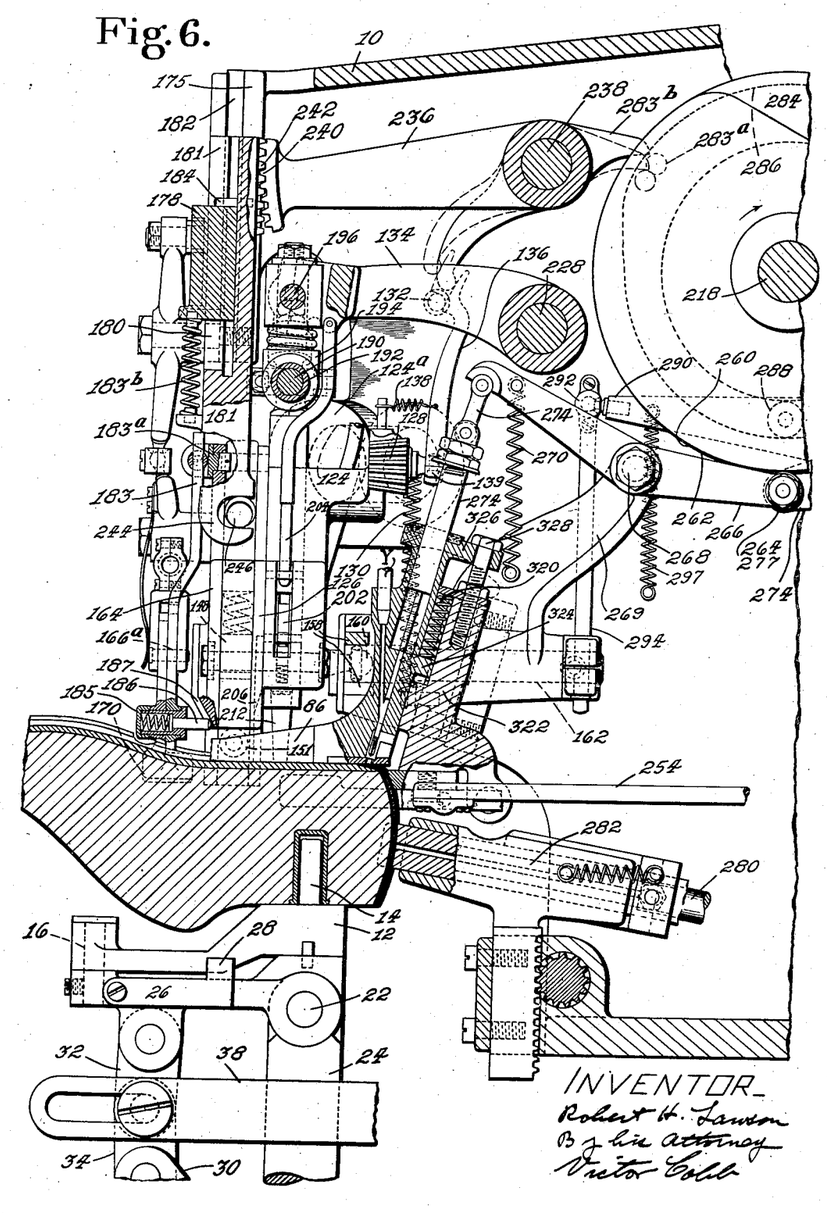
Fig. 6 is a side elevation, partly sectional, of the operating mechanism of the machine.

One pincer jaw 182a of each pair is integral with a plunger 183, the upper end of which works in a friction device 183a (Fig. 6). The lever 166 (Fig. 3) lifts on a yoke carrying a pin 166a (Figs. 3 and 6) which works in a cam slot 166b in the other pincer jaw 182b, and also in a vertical slot in the pincer jaw 182a. The friction device 183a holds the jaw 182a from rising when the lever 166 begins to pull and consequently the jaws close tightly before they begin to rise at all. In the reverse operation, they open before they drop, due to the action of the friction device 183a. The raising of the plate 178 by the block 181 thus first closes and then bodily lifts the pincers 170. The plate 178 is normally forced up in the guide 180 by a spring 183b which holds it against a pin 184 in the block 181. The spring 183b yields when the plate 178 meets with sufficient resistance, permitting the block 181 to continue its upward movement. Pivots 185 of the pincer jaws 170 have backwardly-projecting, sliding, spring-supported pins 186 which ride upon cam surfaces 187 (Fig. 4) on the plates 164, and thus resiliently force the pincers forward and inward as they rise to foredraw and overdraw the upper. The rising movement of the pincers is also resilient in view of the spring 183b, so that the shoe upper, when tensioned, will not be torn.

Figures 15, 16:
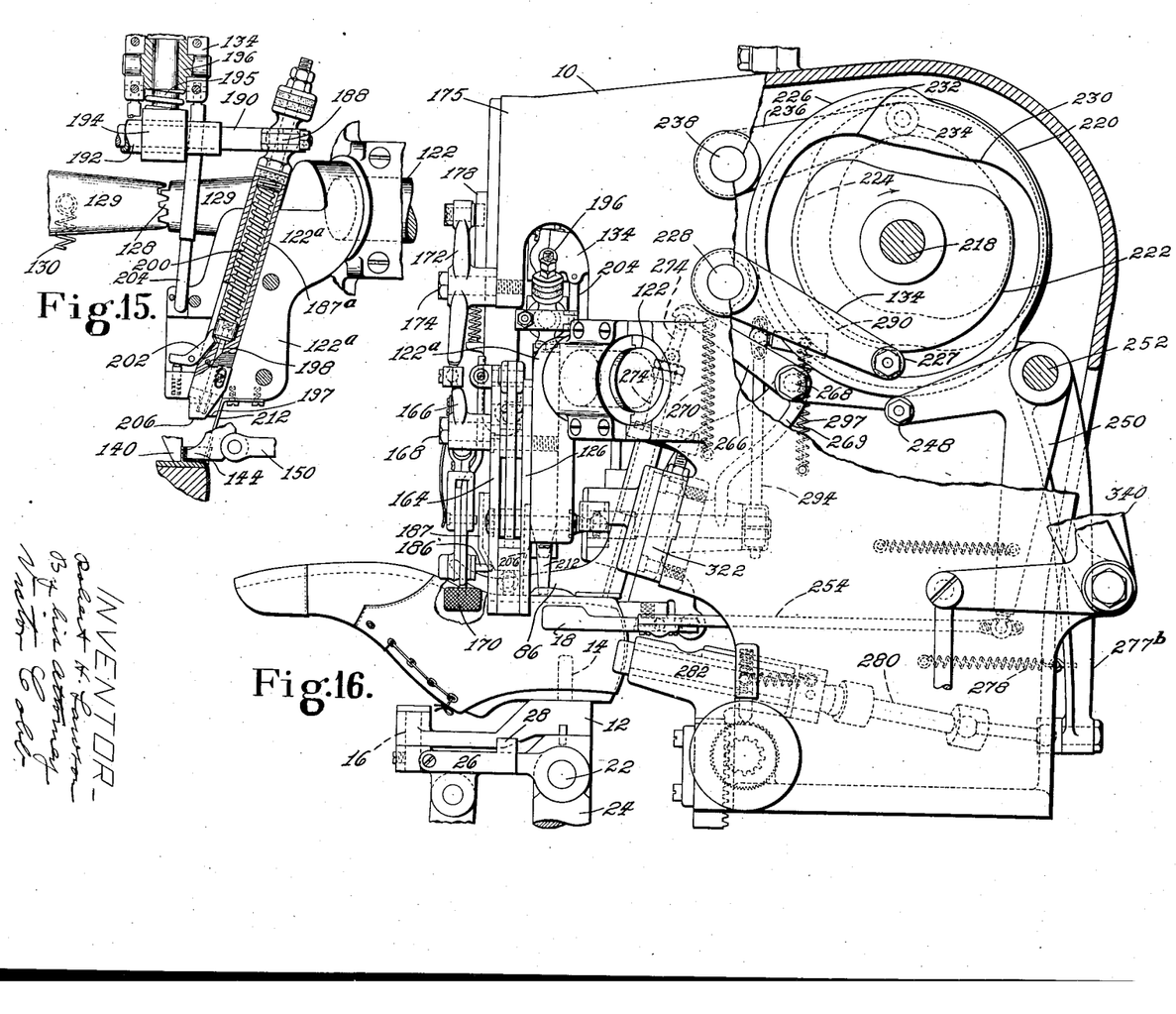
Fig. 15 is a detail of the former, tacker and slitter at the heel breast locality of the shoe.
Fig. 16 is a side elevation of the upper part of the machine.

The slashing of the counter, the bending down of its flange, and the driving of a tack on each side to hold the bent-down flange of the counter just back of the cut, are performed by a pair of plunger members 187a (Figs. 12 and 15) which slide in grooves in the downwardly-extending arms 122a, 124a on the trunnions 122 and 124, behind the plates 126. The members 187a are connected at their upper ends by ball joints 188 to telescoping rods 190, 192 mounted in a head 194 having a resilient and sliding connection at 195 with a crosspiece 196 pivoted in the end of the arm 134 (Fig. 6). Each member 187a is formed at its lower end 197 to bend the counter down to the insole surface. The nozzles through which the tacks are driven are located in the ends 197 and the slashing knives 206 are fastened beside them. When the members 187a are lowered by the member 134, the resilient connection at 195 yields after the ends 197 have bent the counter flange down and positioned the tack nozzles, and after the knives 206 have slashed the counter. Each tack driver bar 198 slides in its member 187a, being forced downward, when the tacks are driven, by the springs 200. When the member 134 is lifted, carrying the members 187a with it, the dogs 202 fall under abutments on the driver bars 198 and the dogs prevent the falling of the driver bars until the ends 197 and knives 206 have reached operative position. As the member 134 continues its descent, by virtue of the resilient connection 195, bars 204 trip the dogs 202, releasing the driver bars 198 which then drive the tacks 205. The trunnion arms 122a and 124a carry fingers 212 (Figs. 12 and 15) which run in between the upper 214 and the counter 208 and lining 216, and prevent tacking the upper at the breast line, the tacks going through the lining and counter flange only.

Power for operating the machine is delivered through a cam shaft 218 (Fig. 11) which extends through the machine and carries a number of disk-like cams keyed on it. The first on the right, 220, has two closed cam slots 222, 224, and a peripheral cam 226. The cam slot 222 by means of a roll 227 (Fig. 16) operates the lever 134 pivoted on a cross-shaft 228 (Fig. 16) upon the front end of which lever 134 are hung the two tackers 187ᵃ which drive the breast tacks 205. Raising the crosspiece 196 lifts the tack drivers 187ᵃ which allows the dogs 202 to fall under the drivers, and when the member 196 drops, the springs 200 are compressed as the tack nozzles and the bars 204 trip the dogs and let the drivers operate under their spring pressure. The tacker tubes also carry the knives 206, which slash through the counter flange at 210.

The cam track 224 (Fig. 16) cooperates with a roll 234 on a lever 236 (Fig. 6) pivoted on the cross-shaft 238 and having a toothed segment 240 (Figs. 6 and 11) on its front end cooperating with a rack 242 on the rear face of the block 181 (Fig. 6) which is arranged to slide in the vertical guide 182. The block 181 has a pair of hooks 244 (Fig. 6) which engage spherical knobs 246 on the levers 154 (Fig. 5) to operate the outside formers or hammers 144.

The peripheral cam 226 (Fig. 16) cooperates with a roll 248 on one arm of a bell-crank lever 250, pivoted at 252, the other arm of which extends downwardly (Fig. 16) and is connected to a rod 254 which runs forward and is pivoted to an arm 256 (Fig. 8) on one of the heel clamps 18. The clamps 18 are normally held in closed position by a resilient device 258, and the turning of the bell-crank lever 250 counterclockwise (Fig. 16) opens the clamp.

The next cam disk to the left of 220 (Fig. 11) is numbered 260 and has a peripheral cam 262. The disk 260 has no cams in its side faces. The peripheral cam 262 cooperates with a roll 264 (Figs. 6, 7 and 11) on a lever 266 which is pivoted at 268 on a frame arm 269 whose front end is pulled down by a spring 270 when the drop 272 is reached. The front end of the lever 266 is connected (Figs. 6 and 16) to the tack driver 274 which drives the tack 276 (Fig. 10) fed by the tube Y in the end of the heel seat of the shoe. This tack is driven by the spring 270 which is stretched by clockwise rotation (Fig. 6) of the lever 266 by the cam 262. The cam 262 also cooperates with a roll 277 (which lies behind the roll 264 in Figs. 6 and 7) on a lever 277ᵃ (Fig. 7) pivoted at 252 and having a downwardly extending arm 277ᵇ (Figs. 11 and 16) which is pulled clockwise by a strong spring 278 (Fig. 16) and is connected to the tack driver rod 280 by a ball-ended link at its end. The tack driver rod 280 operates in the tacker 282 which drives the tack 283 (Fig. 10) at the rear end of the shoe. This tack is driven a little to one side of the back seam, at the time the roll 277 falls off the drop 272. The tack feeding and driving mechanisms, except in so far as specifically described herein may be of ordinary construction.

The cam disk 260 has another function. It carries a pin 283ᵃ (Fig. 6) which strikes a pawl 283ᵇ and swings it to unhook the latch 136 from the pin 132, thus allowing the spring 130 to open out the plates 126 and swing the anvils 140 against the insole ribs of the shoe.

The next cam disk to the left of 260 (Fig. 11) is numbered 284 and has a cam track 286 (Fig. 7) in its left-hand face cooperating with a roll 288 on a lever 290 pivoted at 228 and connected at its front end 292 to a rod 294 which, through a crank arm 296 (Fig. 14), turns the rod 162 which locks the trunnion-carried plates 126 and the inside formers or anvils 140. The lever 290 is pulled counterclockwise by a spring 297 when the cam 286 releases its roll 288, and the function of the rod 294, when tensioned by the cam, is to unlock the trunnions.

The next cam disk to the left (Fig. 11) on the shaft 218 is numbered 298 and has (Fig. 9) a peripheral cam 300 and cam tracks 302, 304 on its sides. The peripheral cam 300 cooperates with a roll 306 on an arm 308 pivoted on the shaft 252 (see Fig. 9), which arm pivotally carries the end of the rod 84 which is connected to the rear end of the jack lifting lever 80 (Fig. 1). The cam track 302 cooperates with a roll 310 on a lever 312 mounted on the shaft 238 and carrying the upper end of the rod 54 which unlocks the jack and permits it to fall forward into the Fig. 1 position. The cam track 304 cooperates with a roll 314 on one arm of a bell-crank 316 pivoted at 252, whose other arm 318 carries the upper end of the rod 112 which operates the jack drawing-in bell-crank lever 110.

The holddown 86 rises under pressure from the jack and shoe against a spring 320 in a frame member 322 in which an upwardly extending arm 324 of the holddown 86 slides. The head 326 of the arm 324 comes up against a rigid but adjustable stop screw 328, when the shoe has reached operative position. A proper correlation of the adjustments at 328 and 108 (Fig. 1) is therefore necessary, with the result that the shoe and last are rigidly held in operative position.

A clutch device 330 (Fig. 1) is provided to control the cam shaft 218. When the treadle rod 332 is lifted it throws a bell crank 334 clockwise. The bell crank engages a pivoted pawl 336 at 338, thus swinging a large pawl member 340, on which the pawl 336 is pivoted, clockwise and releasing the engagement with the clutch at 342. The clutch then starts to revolve clockwise and a hump 344 strikes the end of the pawl 336 and releases the engagement at 338, permitting the member 340 to fall back and engage the clutch again at 346, stopping the machine. This initial movement of the machine brings the jack into vertical position under the holddown 86, when the operator will properly arrange the pincers and the member 212 before re-treadling the machine, after which the upper-drawing, slashing and tack-driving are effected.

Figure 17:
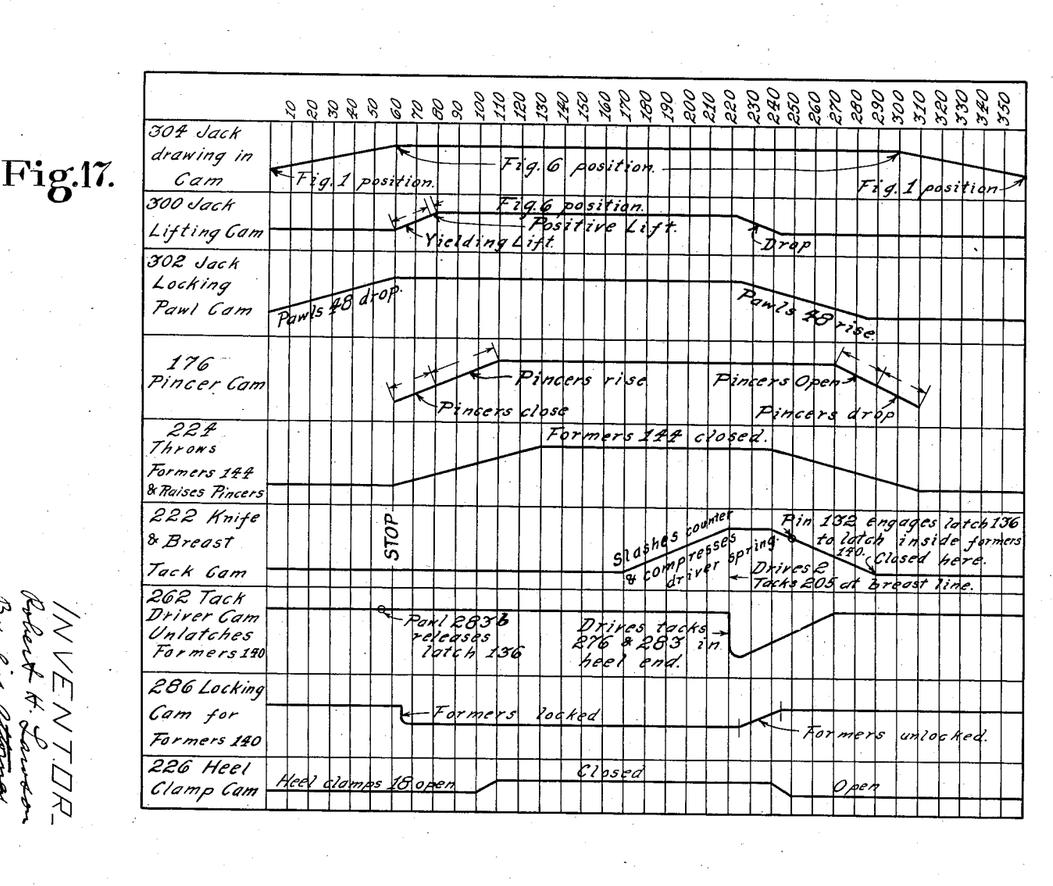
Fig. 17 is a chart showing the details of the cycle of operations of the machine.

The different cam cycles are all shown in Fig. 17 with explanatory legends.

In operating the machine, the operator puts the last and shoe on the jack in the Fig. 1 position, and treadles the machine. After a 60° rotation of the cam shaft 218 the machine stops. During this rotation of the cam shaft, the jack is drawn into the vertical Fig. 6 position, the pawls 42 drop to locking position, and the latch 136 is released, permitting the inside formers 140 to swing outward and forward into contact with the inside faces of the insole ribs 142. The operator then arranges the upper and lining properly relatively to the pincers and the members 212 and re-treadles the machine. Between the 60° and 80° positions of rotation of the cam shaft the formers 140 are locked, the jack lifts and the pincers close. Between the 80° and 110° positions the pincers rise and draw the upper forward, inward and upward. The outside formers 144 close between the 60° and 130° positions. The heel clamps 18 close between the 100° and 110° positions. Between the 170° and 220° positions the counter is slashed and at the 220° position the tacks 205, 276 and 283 are driven, just prior to which the pin 132 engages the latch 136 to begin pulling back the inside formers 140 which are drawn back to initial position at the 290° position of the cam shaft. The jack then drops down (225°–245°) the pawls 42 rise (225°–285°), the pincers open and drop (270°–310°), the outside formers 144 are withdrawn (240°–310°), the tackers 187ª are raised, releasing the springs 200 (240°–290°), the heel clamps 18 open (240°–250°), the formers 140 are withdrawn, and the jack falls forward (300°–360°).

Having described my invention, what I claim as new and desire to secure by Letters Patent of the United States is:

1. In a shoe making machine, instrumentalities for operating on a shoe, a jack movable from an inoperative position, convenient for the placing of a shoe thereon, to an operative position in suitable relation to said instrumentalities, driving mechanism, and a manually-controlled clutch in control thereof, constructed and arranged, when tripped, to move the jack from inoperative to operative position, and then to stop the machine, whereby the operator is afforded an opportunity properly to arrange a shoe on the jack in relation to the said instrumentalities.

2. In a shoe assembling machine, a jack, mechanism for operating on a shoe on the jack, the jack having an operative position in relation to said mechanism for operating on the shoe and an inoperative position remote from said mechanism for operating on the shoe, a manually-controlled clutch, and power mechanism constructed and arranged, when tripped, to move the jack with its shoe from inoperative position to operative position and then to stop the machine, to afford the operator an opportunity to arrange the work properly relatively to the mechanism for operating on it; and, when tripped a second time, to actuate the mechanism for operating on the shoe.

3. In a shoe making machine, instrumentalities for operating on a shoe, a jack movable from an inoperative position, convenient for the placing of a shoe thereon, to an operative position in suitable relation to said instrumentalities, driving mechanism, and a manually-controlled clutch in control thereof constructed and arranged, when tripped, to move the jack from inoperative to operative position and then to stop the machine, whereby the operator is afforded an opportunity properly to arrange a shoe on the jack in relation to the said instrumentalities, and, when tripped a second time, to actuate the said instrumentalities to perform an operation on the shoe.

4. In a shoe making machine, an instrumentality for operating on a shoe, said instrumentality having operative and inoperative positions and being normally in the inoperative position, a jack movable from an inoperative position, convenient for the placing of a shoe thereon, to an operative position, in suitable relation to the operative position of the said instrumentality, and mechanism constructed and arranged, when tripped, to move the jack and the instrumentality into their operative positions and then to stop the machine, whereby the operator is afforded an opportunity properly to arrange a shoe on the jack in relation to the instrumentality.

5. In a shoe making machine, an instrumentality for operating on a shoe, said instrumentality having operative and inoperative positions and being normally in the inoperative position, a jack movable from an inoperative position, convenient for the placing of a shoe thereon, to an operative position, in suitable relation to the operative position of the said instrumentality, and mechanism constructed and arranged, when tripped, to move the jack and the instrumentality into their operative positions and then to stop the machine, whereby the operator is afforded an opportunity properly to arrange a shoe on the jack in relation to the instrumentality, and, when tripped a second time, to actuate the said instrumentality to perform an operation on the shoe.

6. In a shoe assembling machine, operating mechanism comprising an anvil and a former having a movement from an inoperative position to an operative position relatively to a shoe in the machine, said movement being directed outward and forward relatively to the longitudinal median line of the insole of the shoe and starting from a position between the insole ribs, whereby the said movement will bring the said anvil against the inside face of an insole rib, a resilient mechanism for causing said movement, whereby said movement will cease when the anvil has come into contact with the said rib, means for holding said operating mechanism in inoperative position, means for releasing said operating mechanism for the said movement, means for locking the said anvil in operative position against the insole rib, and means for operating the former to mold the end of the shoe counter into the exterior angle between the rib and the bottom surface of the insole.

7. In a shoe assembling machine, a carrier having arranged thereon from front to rear of a shoe in the machine, a tensioning means, an anvil and a former opposed thereto, the anvil being located to the inside of the former relatively to the longitudinal median line of the shoe bottom, and the anvil and former being also located nearer to the insole of the shoe than the other said instrumentalities when in inoperative position, said carrier being constructed and arranged to have a movement forward and outward relatively to the said median line, whereby the anvil will come into contact with the inside face of an insole rib on the shoe at a point farther forward in the case of a larger shoe than of a smaller shoe, mechanism for operating the tensioning means to draw the shoe upper forwardly and upwardly over the rear end of the shoe, and mechanism for operating the former to shape the flange of the counter against the insole rib.

8. In a shoe assembling machine, a carrier having arranged thereon from front to rear of a shoe in the machine, a tensioning means, an anvil and a former opposed thereto, a slashing means and a tacking means, the anvil being located to the inside of the former relatively to the longitudinal central line of the shoe bottom, and the anvil and former being also located nearer to the insole of the shoe than the other said instrumentalities when in inoperative position, said carrier being constructed and arranged to have a movement forward and outward relatively to the said central line, whereby the anvil will come into contact with the inside face of an insole rib on the shoe at a point farther forward in the case of a larger shoe than of a smaller shoe, and mechanism for locking the anvil in the said position and for operating the tensioning means, the former, the slashing means and the tacking means.

9. In a shoe assembling machine, a carrier having arranged thereon from front to rear of a shoe in the machine, an anvil and a former opposed thereto, the anvil being located to the inside of the former relatively to the longitudinal median line of the shoe bottom, said carrier being constructed and arranged to have a movement forward and outward relatively to the said median line, whereby the anvil will be moved adjacent to the shoe bottom and come into contact with the inside face of an insole rib on the shoe at a point farther forward in the case of a larger shoe than of a smaller shoe, said movement of the carrier being resiliently produced, whereby it will terminate when the anvil has come into contact with the insole rib, as stated, and means for locking the anvil in operative position against the insole rib.

10. In a shoe assembling machine, a carrier having arranged thereon from front to rear of a shoe in the machine, a tensioning means, an anvil and a former opposed thereto, the anvil being located to the inside of the former relatively to the longitudinal median line of the shoe bottom, said carrier being constructed and arranged to have a movement forward and outward relatively to the said median line, whereby the anvil will come into contact with the inside face of an insole rib on the shoe at a point farther forward in the case of a larger shoe than of a smaller shoe, means for locking the anvil in operative position against the insole rib, and means for operating the former to mold the end of the shoe counter into the exterior angle between the insole rib and the adjacent surface of the insole.

11. In a shoe assembling machine, a carrier having arranged thereon from front to rear of a shoe in the machine, a tensioning means, an anvil and a former opposed thereto, a slashing means and a tacking means, the anvil being located to the inside of the former relatively to the longitudinal median line of the shoe bottom, said carrier being constructed and arranged to have a movement forward and outward relatively to the said median line, to carry the anvil into contact with the inside face of an insole rib on the shoe at a point farther forward in the case of a larger shoe than of a smaller shoe, means for actuating the tensioning means to grasp the shoe upper and pull it upwardly and forwardly, means for operating the former to mold the flange of the shoe counter into the exterior angle between the insole rib and the adjacent surface of the insole, and means for operating the slashing means and the tacking means to slash the edge of the counter back of the formed portion and to bend the edge of the counter back of the slashed portion down to the surface of the insole and to tack it thereto.

12. In a shoe assembling machine, a carrier, anvil, forming, tacking, slashing, and tension mechanisms mounted thereon, a jack having operative and inoperative positions, said carrier also having operative and inoperative positions, being normally latched in its inoperative position and being resiliently urged toward its operative position along a path running obliquely forward and outward relatively to the bottom of a shoe on the jack when the jack is in its operative position, to bring the said anvil mechanism into contact with the inner face of an insole rib of the shoe, whereby the longitudinal position of the anvil against the rib is determined by the distance of the rib from the median line of the shoe bottom, a clutch operating, when the machine is treadled, to set the machine into operation for a fraction of its cycle and then to stop it, and when retreadled to set the machine into operation for the remainder of the cycle, mechanism controlled by the clutch for moving the jack and its shoe from inoperative to operative position and locking it in such position and mechanism for unlatching the said carrier, thus permitting it to move to operative position relatively to the rear end of the shoe, during the first said fractional cycle, mechanism for operating the tension mechanism to grasp the shoe upper at the heel breast locality and to stretch it upwardly and forwardly, mechanism for operating the forming mechanism to mold the end of the shoe counter against the anvil mechanism into the exterior angle between the insole feather and the insole rib behind the tension mechanism, and means for operating the slashing and tacking mechanisms to slash the upper and counter to the rear of the molded portion and to tack the counter flange to the insole of the shoe at the rear of the slashed portion thereof, during the second fractional cycle of the machine.

13. In a shoe assembling machine, a jack arranged to hold a last with its bottom upward in a substantially horizontal position, twin sets of anvil, forming, cutter and tacking mechanisms located above the rear end of an unlasted shoe on the jack, both sets of said mechanisms being movable as wholes in divergent forwardly and outwardly directed substantially horizontal paths to bring the said anvil mechanisms into contact with the inner faces of the rear ends of the insole ribs of the shoe, whereby such contact occurs farther from the rear end of a larger shoe than of a smaller shoe, mechanism for operating the forming mechanisms for shaping the front ends of the shoe counter into the exterior corners between the feather and ribs of the insole against the anvil mechanisms, and mechanisms for operating the cutter mechanisms to slash the counter edges behind and adjacent to the said shaped portions and to bend down and to tack to the insole the said counter flanges behind and adjacent to the slashed portions.

14. In a machine for securing parts of shoes in assembled relation upon a last preliminary to lasting, the combination of means for supporting an upper and a last in assembled relation, tackers located over the last bottom inwardly and to the rear of the heel breast portion of the counter flange, and means for displacing the tackers forwardly and outwardly to positions over the heel breast region of the counter flange prior to the tacking operation.

15. In a machine for securing parts of shoes in assembled relation upon a last preliminary to lasting, the combination of means for supporting an upper and a last in assembled relation, tackers located over the last bottom inwardly and to the rear of the heel breast portion of the counter flange, and means for displacing the tackers forwardly and outwardly to positions over the heel breast region of the counter flange at each side of the shoe prior to the tacking operation.

16. In a machine for securing parts of shoes in assembled relation upon a last preliminary to lasting, the combination of means for supporting an upper and a last in assembled relation, tackers located over the last bottom inwardly and to the rear of the heel breast portion of the counter flange, and means for displacing the tackers forwardly and outwardly to positions over the heel breast region of the counter flange in movements of equal amplitudes prior to the tacking operation.

17. In a machine for securing parts of shoes in assembled relation upon a last preliminary to lasting, the combination of means for supporting an upper and a last in assembled relation, tackers located over the last bottom inwardly and to the rear of the heel breast portion of the counter flange, and means for displacing the tackers forwardly and outwardly to positions over the heel breast region of the counter flange at each side of the shoe prior to the tacking operation, said means comprising a resilient member for effecting the said movements, and a stop member associated with each tacker constructed and arranged to contact with the inside face of an insole rib to terminate the movement of the associated tacker.

18. In a shoe assembling machine, a jack arranged to hold a last and an inverted shoe with its bottom substantially horizontal, grippers located above the shoe and to the rear of the heel breast region thereof, automatic means for moving the grippers forwardly and outwardly by an amount determined by the size of the shoe, to a position adjacent to the heel breast region of the upper, and means for operating the grippers to grasp and draw the upper around the heel end of the last.

19. In a shoe assembling machine, a jack arranged to hold a last and a shoe with its bottom upward and substantially horizontal, gripper mechanisms located above the shoe, to the rear of the heel breast region thereof, and means for moving the gripper mechanisms forwardly and outwardly to positions above the heel breast region of the upper forward of and adjacent to the heel breast line, by movements proportional to the size of the shoe prior to the operation of the grippers to tension the upper.

20. In a shoe assembling machine, a jack arranged to hold a last and a shoe with its bottom upward and substantially horizontal, gripper mechanisms located above and on each side of the shoe, to the rear of the heel breast region thereof, and means for moving the gripper mechanisms forwardly and outwardly to positions above the heel breast region of the upper forward of and adjacent to the heel breast line, by movements proportional to the size of the shoe, prior to the operation of the grippers to tension the upper, said means comprising a stop member associated with each gripper mechanism arranged to abut the inside faces of an upturned insole rib to terminate the said movement of its associated gripper mechanism.

21. In a shoe assembling machine, means for holding a shoe, an anvil and a former located above the heel seat of the shoe and automatically movable forwardly to a position above the heel breast region of the shoe by a movement proportional to the size of the shoe, and means for operating the former to mold the forward end of the counter flange against the anvil.

22. In a shoe assembling machine, means for holding a shoe, an anvil and a cooperating former located above the heel seat of the shoe, and means for moving the anvil and former forwardly and outwardly to a position straddling the forward end of the counter flange adjacent to and forward of the heel breast line of the shoe, irrespective of the size of the shoe, and means for operating the former to mold the end of the counter flange against the anvil.

23. In a shoe assembling machine, a jack, a self-locating slashing mechanism automatically movable from a position above the heel seat of a shoe on the jack to the heel breast line of the shoe, irrespective of its size, and means for operating the slashing mechanism to slash the counter flange of the shoe at the heel breast line.

24. In a shoe assembling machine, a jack, a self-locating slashing mechanism automatically movable in a forward and outward direction, from a position above the heel seat of a shoe on the jack and adjacent to the median line of its bottom, to a position above the heel breast line of the shoe, irrespective of the size of the shoe, and means for operating the slashing mechanism to slash an upturned counter flange at the heel breast line, from its edge substantially down to the insole of the shoe.

25. In a shoe assembling machine, a jack, two slashing mechanisms normally located above the heel seat of a shoe on the jack, one on each side of the median line of the shoe bottom, and automatically and simultaneously movable forwardly and outwardly from the said position, a stop associated with each said slashing mechanism and arranged to abut the inside face of an upturned insole rib to terminate said movement, when effected, at the heel breast line of the shoe, irrespective of the size of the shoe, and means for simultaneously operating the two slashing mechanisms to slash the counter flange on each side of the shoe at the heel breast line.

26. In a shoe assembling machine, a jack, a tacker normally positioned above the heel seat of a shoe on the jack and automatically movable to and self-locating in a position adjacent to and to the rear of the heel breast line of the shoe, irrespective of the size of the shoe, and means for operating the tacker to tack the end of the counter flange to the insole of the shoe.

27. In a shoe assembling machine, a jack, two tackers normally positioned above the heel seat of a shoe on the jack and to each side of the median line of the shoe, automatic means for moving said tackers forwardly and outwardly from said median line, stops associated with said tackers, respectively, and arranged to contact with the inner faces of the insole ribs of the shoe, respectively, to terminate said movements with the tackers to the rear of, and adjacent to, the heel breast line of the shoe, irrespective of its size, and means for operating the tackers to tack the counter flange to the insole on both sides of the shoe.

28. In a shoe assembling machine, a jack, gripping means and slashing means located on each side of a shoe on the jack, with the gripping means forward of, and slashing means at the breast line of the shoe, means for simultaneously operating the gripping means to draw both sides of the upper of the shoe around the heel end of its last, and means for simultaneously operating the slashing means to slash both ends of the counter flange of the shoe at the breast line.

29. In a shoe assembling machine, a jack arranged to hold a shoe in the machine with the bottom of the shoe in a substantially horizontal position, a vertical pivot for the jack around which the shoe may swing freely, centering mechanism arranged to swing the shoe about the said pivot in order to center the shoe in the machine, two carriers having inoperative positions above the shoe, and adjacent to, and on each side of, the median line of the shoe, mechanism for imparting to said carriers simultaneous equal and opposite outward movements away from said median line, operating mechanisms carried by said carriers, and means for activating said mechanisms to treat the shoe while the carriers are in the positions they occupy at the ends of the said movements.

30. In a shoe assembling machine, a jack arranged to hold a shoe in the machine with the bottom of the shoe in a substantially horizontal position, a vertical pivot for the jack around which the shoe may swing freely, centering mechanism arranged to swing the shoe about the said pivot in order to center the shoe in the machine, two carriers having inoperative positions above the shoe, and adjacent to, and on each side of, the median line of the shoe, mechanism for imparting to said carriers simultaneous equal and opposite outward movements away from said median line, said movements being limited by contact between the insole ribs of the shoe and the carriers, operating mechanisms carried by said carriers, and means for activating said operating mechanisms to treat the shoe while the carriers are in the positions they occupy at the ends of the said movements.

31. In a shoe assembling machine, a jack arranged to hold a shoe with its bottom substantially horizontal, a carrier member having an anvil mounted thereon arranged to move the anvil into operative position against the inside face of an upstanding insole rib on the shoe, a former movably mounted on the carrier, and arranged to cooperate with the anvil to mold the end of a counter flange against the outside face of the insole rib opposite the anvil, a toggle mechanism mounted on the carrier with one end connected to the former and with its other end supported by the carrier, and means for operating the toggle mechanism to drive the former toward the anvil.

32. In a shoe assembling machine, a jack arranged to hold a shoe with its bottom substantially horizontal, a carrier member having an anvil mounted thereon arranged to move the anvil into operative position against the inside face of an upstanding insole rib on the shoe, a former movably mounted on the carrier, and arranged to cooperate with the anvil to mold the end of a counter flange against the outside face of the insole rib opposite the anvil, a toggle mechanism mounted on the carrier and connected at one end to the former, a resilient abutment mounted on the carrier and supporting the other end of the toggle mechanism, and means for operating the toggle mechanism to drive the former toward the anvil.

33. In a shoe assembling machine, forming mechanisms, one on each side of a shoe in the machine, each constructed and arranged to mold an end of the counter flange into the exterior angle between an insole rib and the feather of the insole adjacent to and forward of the heel breast line of the shoe, a tacking mechanism associated with each forming mechanism and arranged to drive a tack through the counter flange and the insole adjacent to and behind the heel breast line, and means for operating the said mechanisms on both sides of the shoe simultaneously.

34. In a shoe assembling machine, forming mechanisms, one on each side of a shoe in the machine, each constructed and arranged to mold an end of the counter flange into the exterior angle between an insole rib and the surface of the insole adjacent to and forward of the heel breast line of the shoe, a tacking mechanism associated with each forming mechanism and arranged to drive a tack through the counter flange and the insole adjacent to and behind the heel breast line, means for automatically positioning said mechanisms in the desired relation to the heel breast line irrespective of the size of the shoe, and means for operating the said mechanisms on both sides of the shoe simultaneously.

35. In a shoe assembling machine, two forming mechanisms located one on each side of a shoe in the machine and each arranged to form an end of the counter flange of the shoe into the exterior angle between an insole rib and the surface of the insole, each forming mechanism having a slashing mechanism associated with it at a fixed distance longitudinally of the shoe, said slashing mechanisms being arranged to slash the counter flange behind the formed portion, and mechanism for operating the two forming and slashing mechanisms on both sides of the shoe simultaneously.

36. In a shoe assembling machine, two forming mechanisms located one on each side of a shoe in the machine and each arranged to form an end of the counter flange of the shoe into the exterior angle between an insole rib and the surface of the insole, each forming mechanism having an associated slashing mechanism located at a fixed distance from it longitudinally of the shoe, said slashing mechanisms being arranged to slash the counter flange behind its formed portion, means for moving the said mechanisms from inoperative positions to positions with the slashing mechanisms at the heel breast line of the shoe, said mechanisms being automatically self-locating in such positions, irrespective of the size of the shoe, and mechanism for operating the two forming and slashing mechanisms on both sides of the shoe simultaneously.

37. In a shoe assembling machine, a pair of slashing mechanisms arranged one on each side of a shoe in the machine, and arranged to slash the ends of the counter flange of the shoe from its edge to points adjacent the angle where the counter flange bends over the heel seat of the shoe, two tacker mechanisms, one behind each slashing mechanism, positioned in fixed relations to the slashing mechanisms respectively, and means for actuating the said mechanisms on both sides of the shoe simultaneously.

38. In a shoe assembling machine, a pair of slashing mechanisms arranged one on each side of a shoe in the machine, and arranged to slash the ends of the counter flange of the shoe from its edge to points adjacent the angle where the counter flange bends over the heel seat of the shoe, two tacker mechanisms, one behind each slashing mechanism, positioned in fixed relations to the slashing mechanisms respectively, means simultaneously moving the said mechanisms forwardly toward the heel breast line of the shoe from an inoperative position at the rear of the heel breast line, means for terminating said movement when the slashing means reach the heel breast line, irrespective of the size of the shoe, and means for actuating the said mechanisms on both sides of the shoe simultaneously.

39. In a shoe assembling machine, two operating mechanims, one on each side of a shoe in the machine, each comprising a tensioning means, a forming means, a slashing means and a tacking means, all located in said order in fixed relative positions relatively to the length of the shoe, means for moving the said mechanisms from an inoperative position, remote from the heel breast line of the shoe, toward the said heel breast line, automatic means for arresting said movement when the slashing means reach the heel breast line, and for then locking the said mechanisms in said position, and means for simultaneously operating the two said mechanisms on both sides of the shoe, to tension the upper at the heel end of the shoe, to mold the ends of the counter flange against the rear outer faces of the insole ribs, to slash the counter flange at the heel breast line and to tack the counter flange to the insole behind said molded positions.

40. In a shoe assembling machine, tensioning mechanism arranged to grip a shoe upper adjacent to and forward of the heel breast line of a shoe in the machine and tension it with a force having substantial updrawing and other components relatively to a shoe in the machine, and forming means arranged to mold the end of a counter flange against the upstanding outer face of the rear end of an insole rib adjacent to the region of application of the tensioning means to the upper.

41. In a shoe assembling machine, tensioning mechanism arranged to grip a shoe upper adjacent to and forward of the heel breast line of a shoe in the machine and tension it with a force having a substantial overdrawing component relatively to a shoe in the machine, and forming means arranged to mold the end of a counter flange against the upstanding outer face of the rear end of an insole rib adjacent to the region of application of the tensioning means to the upper.

42. In a shoe assembling machine, tensioning mechanism arranged to grip a shoe upper adjacent to and forward of the heel breast line of a shoe in the machine and tension it with a force having a substantial foredrawing component relatively to a shoe in the machine, and forming means arranged to mold the end of a counter flange against the upstanding outer face of the rear end of an insole rib adjacent to the region of application of the tensioning means to the upper.

43. In a shoe assembling machine, a jack for holding a last and shoe, tensioning instrumentalities arranged to grasp the shoe upper forwardly of the heel breast region and to tension it over the heel end of the last, a tacking instrumentality arranged to tack the counter flange to the insole at the rear of the heel breast line, and a guard for holding the upper remote from the tacking instrumentality when the tack is driven.

ROBERT H. LAWSON.